(12) United States Patent
Parri et al.

(10) Patent No.: US 7,187,424 B2
(45) Date of Patent: Mar. 6, 2007

(54) COMBINATION OF OPTICAL FILMS COMPRISING A TWISTED A-PLATE AND A POLARIZER

(75) Inventors: Owin Parri, Dorset (GB); Karl Skjonnemand, Hampshire (GB); Kim Slaney, Dorset (GB); Mark Verrall, Wiltshire (GB)

(73) Assignee: Merck Patent GmbH, Darmstadt (DE)

( * ) Notice: Subject to any disclaimer, the term of this patent is extended or adjusted under 35 U.S.C. 154(b) by 122 days.

(21) Appl. No.: 10/471,585

(22) PCT Filed: Feb. 22, 2002

(86) PCT No.: PCT/EP02/01932

§ 371 (c)(1),
(2), (4) Date: Sep. 12, 2003

(87) PCT Pub. No.: WO02/073301

PCT Pub. Date: Sep. 19, 2002

(65) Prior Publication Data

US 2004/0095532 A1 May 20, 2004

(30) Foreign Application Priority Data

Mar. 13, 2001 (EP) .................................. 01106100

(51) Int. Cl.
*G02F 1/1335* (2006.01)
(52) U.S. Cl. ................... 349/117; 349/121; 349/118; 349/119; 349/120; 349/96
(58) Field of Classification Search ........ 349/117–119, 349/96–98, 120, 121
See application file for complete search history.

(56) References Cited

U.S. PATENT DOCUMENTS

| | | | | |
|---|---|---|---|---|
| 5,504,603 A * | 4/1996 | Winker et al. | ............... | 349/117 |
| 5,548,426 A * | 8/1996 | Miyashita et al. | .......... | 349/117 |
| 5,619,352 A * | 4/1997 | Koch et al. | ................... | 349/89 |
| 5,798,809 A | 8/1998 | Nakamura et al. | | |
| 5,855,971 A * | 1/1999 | Kobori et al. | ................ | 428/1.2 |
| 6,099,758 A * | 8/2000 | Verrall et al. | ................ | 252/585 |
| 6,166,790 A * | 12/2000 | Kameyama et al. | .......... | 349/96 |
| 6,319,963 B1 | 11/2001 | Coates et al. | | |
| 6,495,217 B2 * | 12/2002 | Farrand | ........................ | 428/1.1 |
| 7,009,670 B1 * | 3/2006 | Huang et al. | ................ | 349/117 |
| 2001/0026335 A1 * | 10/2001 | Moon | ........................... | 349/63 |

FOREIGN PATENT DOCUMENTS

| | | |
|---|---|---|
| EP | 0908745 | 4/1999 |
| EP | 0982605 | 3/2000 |
| EP | 982605 A1 * | 3/2000 |

OTHER PUBLICATIONS

Mukai J et al., "A liquid-crystal polymer film for optical applications," SID International Symposium Digest Technical Papers, San Jose, Jun. 14-16, 1994, Santa Ana, SID, US, Jun. 14, 1994, pp. 241-244, vol. 25, XP000462705, p. 241, line R -p. 242; figure 1.

* cited by examiner

*Primary Examiner*—David Nelms
*Assistant Examiner*—(Nancy) Thanh-Nhan Phan Nguyen

(57) ABSTRACT

The invention relates to a combination of optical films comprising a twisted A-plate retarder and a polarizer, its use in displays and optical elements, and to displays comprising such a combination.

19 Claims, 2 Drawing Sheets

COMBINATION OF OPTICAL FILMS COMPRISING A TWISTED A-PLATE AND A POLARIZER

FIELD OF THE INVENTION

The invention relates to a combination of optical films comprising a twisted A-plate retarder and a polarizer, its use in displays and optical elements, and to displays comprising such a combination.

BACKGROUND OF THE INVENTION

In prior art it is known that when a quarter wave optical retardation plate or film (QWF) is used in combination with a linear polarizer, the linearly polarized light transmitted by the polarizer will be transformed into circularly polarized light. Alternatively, if a QWF is used in combination with a circular polarizer, the circularly polarized light transmitted or reflected by the polarizer will be transformed into linearly polarized light.

QWFs are particularly useful for combination with a broadband cholesteric polarizer reflecting circular polarized light of a broad wavelength range and a single handedness and transmit circular polarized light of the same wavelength band and opposite handedness.

As QWF usually a stretched polymer film of e.g. polyvinylalcohol (PVA) or polycarbonate (PC) is used.

A combination of a QWF and a broadband cholesteric polarizer is disclosed for example in EP 0 606 940, WO 96/02016, WO 97/35219 and EP 0 982 605. For example EP 0 606 940 and WO 96/02016 disclose a linear polarizer consisting of a broadband cholesteric polarizer and a QWF comprising a stretched film of isotropic polymer. The circular polarized light transmitted by the broadband cholesteric polarizer is transformed into linear polarized light by the QWF. The combination of QWF and broadband polarizer is suitable as replacement of standard absorption polarizers and/or as light enhancement film for displays as described in these documents.

However, prior art QWFs comprising stretched polymer films as described above do exhibit only moderate optical anisotropy. Therefore, to achieve the desired net retardation, which is the product of birefringence and film thickness, a high film thickness is required, which is disadvantageous especially for use in flat panel displays. Furthermore, when a liquid crystal display comprising a cholesteric polarizer and a QWF as described e.g. in EP 0 606 940 or WO 96/02016 is watched under an increasing viewing angle, its optical properties like the luminance and the contrast ratio are deteriorating.

Therefore one aim of the present invention is to provide an optical QWF retarder for use in combination with a linear or circular polarizer, in particular for use in combination with a broadband reflective polarizer, that does not have the drawbacks of prior art films.

WO 98/04651 discloses a combination of a broadband cholesteric polarizer with a QWF retarder comprising polymerized liquid crystal (LC) material with planar orientation. WO 98/12584 discloses a QWF retarder comprising a polymerized LC material with tilted orientation. These films give improved properties and allow lower film thickness compared to stretched plastic films. However, they are disadvantageous for mass production due to the fixed orientation of their optical axis.

Thus, for mass production roll-to-roll lamination of the QWF to other optical films, like compensators or polarizers, is desired. However, some applications require that the optical axes of the QWF and the adjacent optical film are not parallel but twisted at an angle to each other. In this case, roll-to-roll coating or lamination of the films is not possible, but instead piece-to-piece lamination of the QWF to the adjacent optical film is necessary. This is more complicated and time-and material-consuming especially when the optical film pieces have to be cut at an angle, e.g. in case the optical axes of adjacent films are aligned neither parallel nor at right angles, but at oblique angles within the film plane. In case of optical films comprising polymerized LC material, alternatively special rubbing techniques must be applied to achieve alignment of the optical axis at oblique angles in the film plane.

Therefore another aim of the present invention is to provide an optical retarder suitable for use in combination with other optical films like polarizers and/or compensators, which is easy to manufacture and is particularly suitable for mass production.

The inventors have found that this aim can be achieved by providing a retardation film comprising a mesogenic or LC material with twisted structure and planar orientation, for example a cholesteric LC material. In the following such a film will be shortly referred to as twisted A-plate.

In the twisted A-plate film according to the invention the mesogens or LC molecules of the mesogenic or LC material are oriented substantially parallel to the plane of the film and with their long molecular axis oriented in a preferred direction within molecular sublayers, said preferred orientation direction in different molecular sublayers being twisted at an angle φ around a helix axis. In case of an optically uniaxial LC material with positive birefringence the preferred orientation direction of the LC molecules corresponds to the optical axis in each sublayer. Thus, a twisted A-plate according to the present invention includes multiple molecular sublayers with different directions of the optical axis.

The twisted A-plate according to the present invention has the manufacturing advantage that the direction of alignment can be set at any angle and the retardation determined by the twist and the thickness of the film. This will allow roll-to-toll coating rather than piece-to-piece lamination with other optical films, where non-parallel alignment of the optical axes is required.

Optical films with twisted structure are known in prior art and have been suggested as compensators for TN and STN displays, for example in EP 0 423 881, EP 0 576 931 and U.S. Pat. No. 5,243,451. The optical films described in these documents comprise a twisted nematic LC material, e.g. a nematic polymer, with a twist angle in the same range as that of the LC medium in the display cell that is to be compensated, i.e. between about 90° for TN cells and up to 270° for STN cells. GB 2,315,072 discloses an optical film comprising a polymerized cholesteric LC material with helically twisted orientation, wherein the helical pitch is selected such that the film shows reflection of circular polarized UV light, and its use as a circular UV polarizer. However, there is no suggestion in the above documents to use twisted retardation films as OWF in combination with a circular or linear polarizer.

SUMMARY OF THE INVENTION

One object of the present invention is a combination of optical films comprising at least one twisted A-plate retarder and at least one polarizer.

Another object of the invention is the use of a combination optical films comprising at least one twisted A-plate retarder and at least one polarizer in active or passive optical elements, in particular in displays like liquid crystal displays, organic light emitting diodes (OLED) or cathode ray tube (CRT) displays, in particular as light-enhancing or anti-reflection film for displays or other applications.

Another object of the invention is a liquid crystal display comprising a combination of optical films comprising at least one twisted A-plate retarder and at least one polarizer.

Definition of Terms

In connection with optical polarization, compensation and retardation layers, films or plates as described in the present application, the following definitions of terms as used throughout this application are given.

The term 'film' as used in this application includes self-supporting, i.e. free-standing, films that show more or less pronounced mechanical stability and flexibility, as well as coatings or layers on a supporting substrate or between two substrates.

The term 'liquid crystal or mesogenic material' or 'liquid crystal or mesogenic compound' should denote materials or compounds comprising one or more rod-shaped, board-shaped or disk-shaped mesogenic groups, i.e. groups with the ability to induce liquid crystal phase behaviour. The compounds or materials comprising mesogenic groups do not necessarily have to exhibit a liquid crystal phase themselves. It is also possible that they show liquid crystal phase behaviour only in mixtures with other compounds, or when the mesogenic compounds or materials, or the mixtures thereof, are polymerized.

For the sake of simplicity, the term 'liquid crystal material' is used hereinafter for both liquid crystal materials and mesogenic materials, and the term 'mesogen' is used for the mesogenic groups of the material.

The term 'quarter wave film' or 'quarter wave foil' (QWF) means a retardation film with an optical net retardation that is substantially an odd integral multiple of 0.25 times the wavelength of incident light. This also includes e.g. a 'three-quarter' or 'five-quarter' wave film.

The term 'planar structure' or 'planar orientation' means that the optical axis of the film is substantially parallel to the film plane. This definition also includes films wherein the optical axis is slightly tilted relative to the film plane, with an average tilt angle throughout the film of up to 1°, and which exhibit the same optical properties as a film wherein the optical axis is exactly parallel, i.e. with zero tilt, to the film plane.

The term 'helically twisted structure' relates to a film comprising one or more layers of liquid crystal material wherein the mesogens are oriented with their main molecular axis in a preferred direction within molecular sublayers, said preferred orientation direction in different sublayers being twisted at an angle φ around a helix axis. The term 'helically twisted structure with planar orientation' means a film with helically twisted structure as described above, wherein the helix axis is substantially perpendicular to the film plane, i.e. substantially parallel to the film normal. This definition also includes orientations where the helix axis is tilted at an angle of up to 2° relative to the film normal.

The term 'homeotropic structure' or 'homeotropic orientation' means that the optical axis of the film is substantially perpendicular to the film plane, i.e. substantially parallel to the film normal. This definition also includes films wherein the optical axis is slightly tilted at an angle of up to 2° relative to the film normal, and which exhibit the same optical properties as a film wherein the optical axis is exactly parallel, i.e. with no tilt, to the film normal.

In planar and homeotropic optical films comprising uniaxially positive birefringent liquid crystal material with uniform orientation, the optical axis of the film as referred to throughout this invention is given by the preferred orientation direction of the mesogens of the liquid crystal material.

The term 'A-plate' means an optical retarder utilizing a layer of uniaxially birefringent material with its extraordinary axis oriented parallel to the plane of the layer, and its ordinary axis (also called 'a-axis') oriented perpendicular to the plane of the layer, i.e. parallel to the direction of normally incident light.

The term 'C-plate' means an optical retarder utilizing a layer of a uniaxially birefringent material with its extraordinary axis (also called 'c-axis') perpendicular to the plane of the layer, i.e. parallel to the direction of normally incident light.

A-plate and C-plate retarders are also described in U.S. Pat. No. 5,619,352, the entire disclosure of which is incorporated into this application by way of reference.

Throughout this invention, an A- or C-plate comprising optically uniaxial birefringent material with positive birefringence is also referred to as '+A/C-plate' or 'positive A/C-plate'. An A- or C-plate comprising a film of optically uniaxial birefringent material with negative birefringence is also referred to as '−A/C-plate' or 'negative A/C-plate'.

An A-plate comprising a film of liquid crystal material with planar orientation, or having optical properties similar to such a film, is also referred to as 'planar A-plate'. An A-plate comprising a film of liquid crystal material with helically twisted structure and planar orientation, or having optical properties similar to such a film, is also referred to as 'twisted A-plate'.

DETAILED DESCRIPTION OF THE INVENTION

As described above a twisted A-plate according to the present invention has the manufacturing advantage that the direction of alignment can be set at any angle and the retardation determined by the twist and the thickness of the film. This will allow roll-to-toll coating rather than piece-to-piece lamination with other optical films, where non-parallel alignment of the optical axes is required.

Figure 1A:
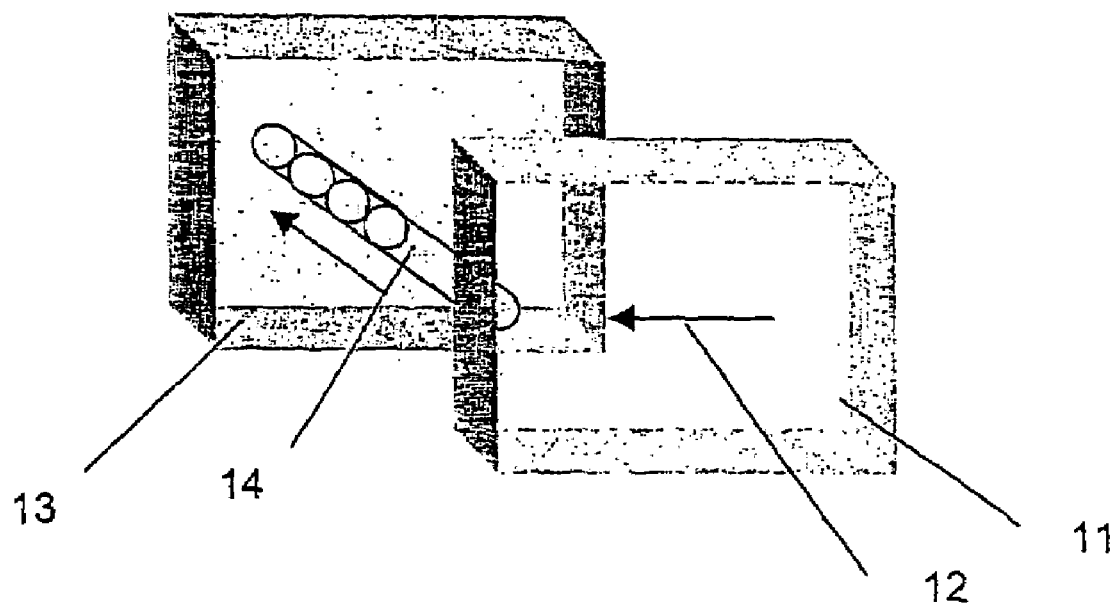
FIG. 1a shows a combination of a prior art QWF and a polarizer.
Figure 1B:
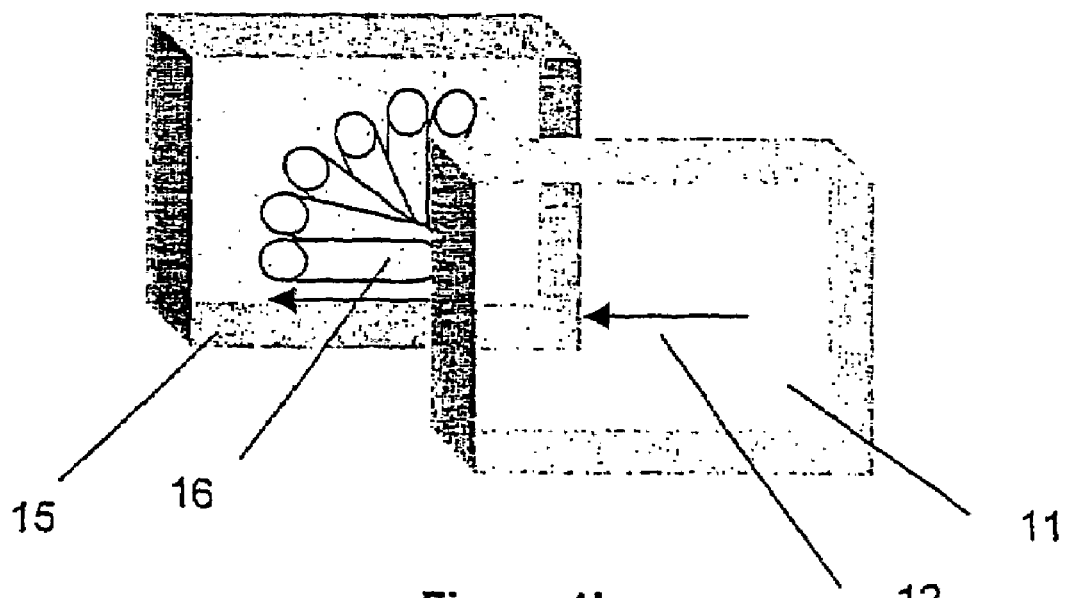
FIG. 1b shows a combination of a twisted A-plate QWF and a polarizer according to the present invention.

This is exemplarily depicted in FIGS. 1a and 1b. FIG. 1a shows a combination of prior art comprising a linear polarizer 11 with a polarization direction as depicted by arrow 12. The combination further comprises a sheet 13 of a non-twisted prior art QWF comprising polymerized nematic LC material, wherein the LC molecules are aligned at a preferred direction 14 forming an oblique angle of e.g. 45° with the edges of the QWF sheet 13 and the polarization direction 12 of the linear polarizer 11. FIG. 1*b* shows a combination of a linear polarizer polarizer 11 and a sheet 15 of a twisted A-plate QWF according to the present invention comprising a polymerized cholesteric LC material, wherein the preferred direction 16 of the LC molecules in different molecular sublayers is twisted at an angle 90° around an axis perpendicular to the plane of the QWF. Due to the twist angle of 90° the QWF sheet 15 can be laminated at any angle to the polarizer 11, for example with its edges aligned parallel to the edges of the polarizer as shown in FIG. 1*b*, whilst maintaining similar performance as the non-twisted QWF film.

In the combination shown in FIG. 1*b*, the twisted A-plate 15 is located such it faces the polarizer 11 with its side where the preferred direction 16 of the LC molecules is parallel to the polarization axis 12 of the polarizer 11. However, it is also possible to place the twisted A-plate QWF such that its opposite side is facing the polarizer.

In general, in a combination of optical films according to the present invention the twisted A-plate can be located with either of its sides facing the polarizer.

The twist angle $\phi$ of a twisted A-plate according to the present invention is preferably from 15 to 400°, in particular from 20 to 340°.

The twist angle $\phi$ of the twisted A-plate can also be expressed by the helical pitch p of the LC material and the thickness d of the twisted A-plate according to the equation $$\phi = 360° \cdot d/p$$

The helical pitch p of the twisted A-plate is preferably from 1 to 20 μm, very preferably from 1.5 to 5 μm.

The thickness d of the twisted A-plate is in each case independently preferably from 0.1 to 10 μm, in particular from 0.2 to 7 μm, most preferably from 0.5 to 2.5 μm. For some applications, a film thickness between 2 and 15 μm is also suitable.

In a particularly preferred embodiment the twisted A-plate comprises a chiral LC material, e.g. a twisted nematic or cholesteric LC material, very preferably a polymerized LC material.

It is also possible to use e.g. a twisted nematic polymer film as described in the EP 0 423 881, EP 0 576 931 or U.S. Pat. No. 5,243,451.

It is also possible to use as twisted A-plate a layer of a non-polymerized LC material. For example, a nematic liquid crystal mixture can be used that is provided between two transparent substrates and exhibits a planar twisted orientation, wherein the twist is induced by different orientecu- of the LC molecules at the substrates, like in a standard type TN cell, or the twist is brought about by one or more chiral dopants added to the nematic material. Alternatively a layer of a cholesteric LC mixture can be used.

Preferred embodiments relate to a twisted A-plate wherein
the helical twist angle $\phi$ of the twisted A-plate is from 20 to 340°,
the helical pitch p of the twisted A-plate is from 1 to 5 mm,
the thickness d of the twisted A-plate is from 0.1 to 10 μm, preferably from 0.5 to 5 μm, most preferably from 0.8 to 1.5 μm,
the optical retardation of the twisted A-plate is from 6 to 300 nm,
the twisted A-plate comprises linear or crosslinked polymerized LC material, preferably chiral nematic (cholesteric) or chiral smectic LC material, with planar orientation.

When used in combination with a polarizer, like e.g. a linear or circular polarizer, the twisted A-plate preferably has a net retardation that is approximately an odd integral multiple of 0.25 times the wavelength transmitted or reflected by the polarizer, thus acting as a QWF.

The twisted A-plate can for example be used as a QWF in combination with a linear polarizer to form a circular polarizer. Such a combination, in addition to the manufacturing advantages explained above, also shows improved off-axis luminance and colour shift compared to a combination comprising a QWF of prior art. It is also particularly useful as anti-reflection film, e.g. for LC, OLED or CRT displays or other applications.

Alternatively the twisted A-plate can be used as a QWF in combination with a circular polarizer, like for example a cholesteric reflective polarizer that reflects 50% of the intensity of incident light as circular polarized light of a single handedness, and transmits the other 50% as circular polarized light of the opposite handedness. The circular reflective polarizer can for example be a notch polarizer reflecting a specific wavelength or a narrow band of wavelengths, or a broadband polarizer reflecting a broad wavelength band with a bandwidth of e.g. 100 nm or more. If the circular polarizer is a broadband reflective polarizer, the combination can be used as light-enhancing film or linear polarizer in a display as described e.g. in EP 0 606 940. Alternatively, if the circular polarizer is a narrow band or notch polarizer, the combination can be used as polarization or colour filter.

For example a combination of a twisted A-plate and a broadband relfective polarizer has the above mentioned manufacturing advantages whilst showing comparable or even improved optical performance compared to a combination comprising a QWF of prior art.

Further to the combined use with a polarizer as described above, the twisted A-plate retarder according to the present invention can also be used as individual component, for use e.g. as viewing angle compensation film or achromatic QWF in liquid crystal displays or other applications. A single twisted A plate as described above and below and its uses are another object of the invention.

Preferred embodiments of the present invention relate to a combination of a twisted A-plate and a polarizer, wherein
the polarizer is a linear polarizer,
the linear polarizer comprises linear or crosslinked polymerized LC material, preferably nematic or smectic LC material, with planar orientation,
the twisted A-plate converts substantially linear polarized light transmitted or reflected by the polarizer into substantially circular polarized light,
the twisted A-plate is a QWF retarder with a net retardation of approximately x/4 times the wavelength transmitted by the linear polarizer, wherein x is an odd integer $\geq 1$, preferably 1, 3 or 5,
the polarizer is a circular polarizer,
the circular polarizer comprises linear or crosslinked polymerized chiral LC material, preferably cholesteric or chiral smectic material, with planar orientation,
the circular polarizer is a broadband reflective polarizer, preferably with a reflection bandwidth of at least 100 nm, in particular of at least 200 nm, very preferably of at least 280 nm,
the twisted A-plate converts substantially circular polarized light transmitted or reflected by the polarizer into substantially linear polarized light,
the twisted A-plate is a QWF retarder with a net retardation of approximately x/4 times the wavelength of the central wavelength reflected by the circular polarizer, wherein x is an odd integer $\geq 1$, preferably 1, 3 or 5, the broadband reflective polarizer has a pitch gradient in a direction perpendicular to the plane of the polarizer, with a minimum pitch at one surface (blue end) and a maximum pitch (red end) at the opposite surface (red end), the twisted A-plate is located at the blue end side of the broadband reflective polarizer, the twisted A-plate is located at the red end side of the broadband reflective polarizer, the combination additionally comprises at least one C-plate retarder, for example a +C-plate or –C-plate retarder, preferably a +C-plate retarder, the C-plate retarder comprises at least one layer of polymerized LC material, preferably nematic or smectic LC material, in particular nematic or smectic A LC material, with homeotropic orientation.

The +C-plate retarder is preferably a film comprising polymerized LC material with homeotropic orientation as described for example in WO 98/00475, the entire disclosure of which is incorporated into this application by reference.

The –C-plate is preferably a highly twisted A-plate with a twist angle of more than 360°, a pitch p of 250 nm or less and reflecting UV light, as described e.g. in WO 01-20394 and GB 2,315,072, the entire disclosure of which is incorporated into this application by reference.

A preferred embodiment of the present invention relates to a liquid crystal display comprising a liquid crystal cell formed by two transparent substrates having surfaces which oppose each other, an electrode layer provided on the inside of at least one of said two transparent substrates and optionally superposed with an alignment layer, and a liquid crystal medium which is present between the two transparent substrates, a first and a second linear polarizer sandwiching the liquid crystal cell, a light source or a reflective layer at the side of the second linear polarizer facing away from the liquid crystal cell, at least one broadband reflective polarizer situated between the second linear polarizer and the light source or reflective layer, at least one twisted A-plate retarder according to the present invention, situated adjacent to the broadband reflective polarizer, preferably between the broadband reflective polarizer and the second linear polarizer, optionally a C-plate retarder, preferably a positive C-plate retarder, situated adjacent to the twisted A-plate, preferably between the twisted A-plate and the broadband reflective polarizer, optionally one or more further optical retardation or compensation films or layers, which can be situated adjacent to one or both sides of each of the above components, preferably between the liquid crystal cell and the first linear polarizer, between the liquid crystal cell and the second linear polarizer, adjacent to one or both sides of the twisted A-plate and/or adjacent to one or both sides of the broadband reflective polarizer, it being possible for the above elements to be separated, stacked, mounted on top of each other or connected by means of adhesive layers in any combination of these means of assembly.

As a light source for the inventive LC display preferably a standard backlight for liquid crystal displays, like e.g. a side-lit or a meander type backlight, can be used. These backlights typically comprise a lamp, a reflector, a light guide and optionally a diffuser.

Alternatively to backlit displays, the combination according to the present invention can also be applied in a reflective display which instead of an electric light source makes use of a reflector, like e.g. a metallic layer, that reflects light generated outside the display. The inventive combination is particularly suitable as replacement for the stretched films used in reflective displays, providing the advantage of reduced manufacturing cost.

Thus, another preferred embodiment relates to a reflective liquid crystal display comprising a linear polarizer, a liquid crystal cell formed by two transparent substrates having surfaces which oppose each other, an electrode layer provided on the inside of at least one of said two transparent substrates and optionally superposed with an alignment layer, and a liquid crystal medium which is present between the two transparent substrates, at least one twisted A-plate retarder according to the present invention, situated adjacent to the linear polarizer, preferably between the linear polarizer and the liquid crystal cell, a reflective layer at the side of the liquid crystal cell facing away from the linear polarizer, optionally a C-plate retarder, preferably a positive C-plate retarder, situated adjacent to the twisted A-plate, preferably between the twisted A-plate and the broadband reflective polarizer, optionally one or more further optical retardation or compensation films or layers, which can be situated adjacent to one or both sides of each of the above components, preferably between the liquid crystal cell and the first linear polarizer, between the liquid crystal cell and the second linear polarizer, adjacent to one or both sides of the twisted A-plate and/or adjacent to one or both sides of the broadband reflective polarizer, it being possible for the above elements to be separated, stacked, mounted on top of each other or connected by means of adhesive layers in any combination of these means of assembly.

As linear polarizer in a combination of optical films or a display according to the present invention, a standard type commercially available polarizer can be used. In a preferred embodiment of the present invention the linear polarizer is a low contrast polarizer. In another preferred embodiment of the present invention the linear polarizer is a dichroic polarizer, like a dyed polarizer.

The individual optical components in the combinations of optical films and displays according to the invention, such as the liquid crystal cell, the individual retarders and the linear polarizers, can be separated or can be laminated to other components. They can be stacked, mounted on top of each other or be connected e.g. by means of adhesive layers. It is also possible that stacks of two or more films are prepared by coating the liquid crystalline material of a film directly onto an adjacent film, the latter serving as substrate.

The combination of optical films and/or the display device according to the present invention may further comprise one or more further optical layers or films, like polarizers or compensation or retardation films with twisted, homeotropic, planar, tilted or splayed structure. Tilted or splayed retardation and compensation films are described for example in U.S. Pat. No. 5,619,352, WO 97/44409, WO 97/44702, WO 97/44703 and WO 98/12584. Homeotropic compensators are described for example in WO 98/00475. Planar retarders are described for example in WO 98/04651. The entire disclosure of these documents is incorporated into this application by reference. Particularly preferred are optical films comprising polymerized LC material.

The combination of optical films and/or the display device according to the present invention may further comprise one or more adhesive layers provided to the individual optical components.

In case the LC material in the twisted A-plate is an LC polymer with high adhesion, separate adhesive layers may also be omitted. Highly adhesive polymers are for example liquid crystal polyepoxides. Furthermore, linear or crosslinked LC polymers with low degree of crosslinking show higher adhesion than highly crosslinked polymers. The above highly adhesive LC polymers are therefore preferred for specific applications, especially for those which do not tolerate additional adhesive layers.

The inventive combination may also comprise one or more protective layers provided on the surface of the individual optical components described above.

The combination of a twisted A-plate and a polarizer according to the present invention can be used in active or passive optical elements like polarizers, compensators, beam splitters, colour filters, projection systems or electrooptical displays, in particular as light-enhancing or anti-reflection film for displays or other applications. For example, it can be used in liquid crystal displays, in particular those of the twisted nematic mode, such as TN, STN or AMD-TN displays, those of the IPS mode, those of the vertically aligned mode, like e.g. ECB, CSH, VAN or VAC displays, those of the bend mode or π-cell mode, like e.g. OCB displays. Further applications are e.g. in organic light emitting diodes (OLED) or cathode ray tube (CRT) displays.

In a preferred embodiment of the invention, the twisted A-plate is a film of polymerized cholesteric LC material which is prepared as described for example in WO 01-20394, GB 2,315,072 or in analogy thereto. Such a film can be obtained by coating a layer of a chiral polymerizable mesogenic material onto a substrate or between two substrates, aligning the material into a twisted orientation, wherein the helical twist axis is perpendicular to the plane of the layer, and polymerizing the material by exposure to heat or actinic radiation.

The polymerizable material preferably comprises one or more achiral polymerizable mesogenic compounds and at least one chiral compound. The chiral compound can be selected from non-polymerizable chiral compounds, like e.g. chiral dopants as used in liquid crystal mixtures or devices, polymerizable chiral non-mesogenic or polymerizable chiral mesogenic compounds.

Preferably the polymerizable mesogenic material comprises at least one polymerizable mesogen having one polymerizable functional group and at least one polymerizable mesogen having two or more polymerizable functional groups.

In another preferred embodiment the polymerizable material comprises polymerizable mesogenic compounds having two or more polymerizable functional groups (di- or multi-reactive or di-or multifunctional compounds). Upon polymerization of such a mixture a three-dimensional polymer network is formed. An optical retardation film made of such a network is self-supporting and shows a high mechanical and thermal stability and a low temperature dependence of its physical and optical properties.

By varying the concentration of the multifunctional mesogenic or non mesogenic compounds the crosslink density of the polymer film and thereby its physical and chemical properties such as the glass transition temperature, which is also important for the temperature dependence of the optical properties of the optical retardation film, the thermal and mechanical stability or the solvent resistance can be tuned easily.

The achiral and chiral polymerizable mesogenic mono-, di- or multireactive compounds used for the instant invention can be prepared by methods Which are known per se and which are described, for example, in standard works of organic chemistry such as, for example, Houben-Weyl, Methoden der organischen Chemie, Thieme-Verlag, Stuttgart. Typical examples are described for example in WO 93/22397; EP 0 261 712; DE 19504224; DE 4408171 and DE 4405316. The compounds disclosed in these documents, however, are to be regarded merely as examples that do not limit the scope of this invention.

Examples representing especially useful monoreactive chiral and achiral polymerizable mesogenic compounds are shown in the following list of compounds, which should, however, be taken only as illustrative and is in no way intended to restrict, but instead to explain the present invention:

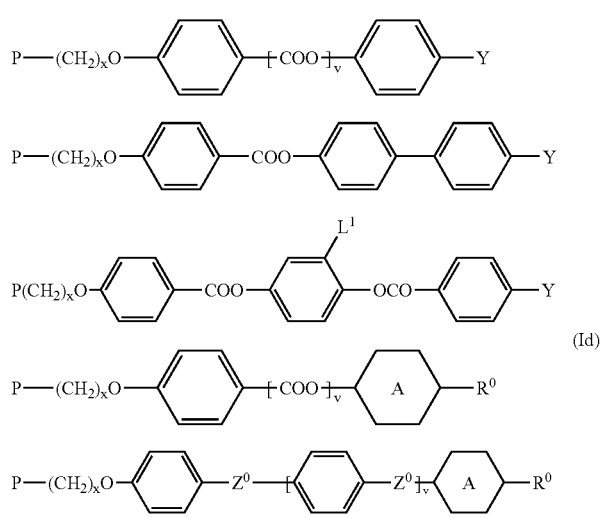

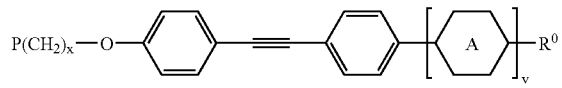 (Ig)
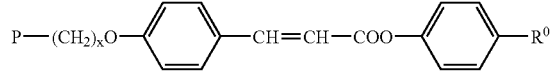 (Ih)
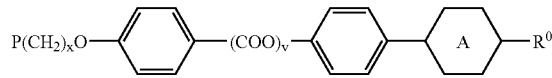 (Ii)
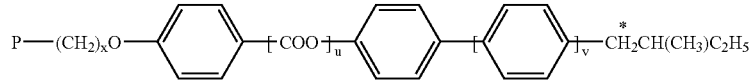 (Ik)
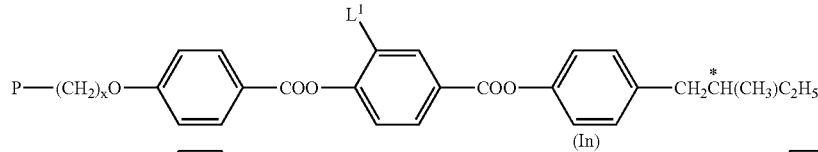 (Im)
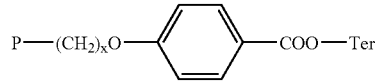 (In)
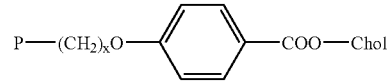 (Io)
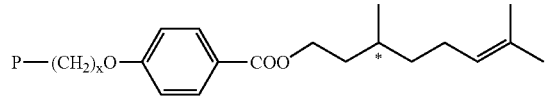 (Ip)
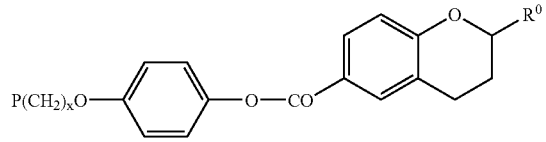 (Iq)
Examples of useful direactive chiral and achiral polymerizable mesogenic compounds are shown in the following list of compounds, which should, however, be taken only as illustrative and is in no way intended to restrict, but instead to explain the present invention
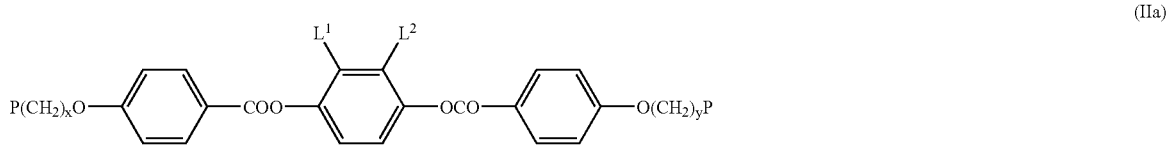 (IIa)
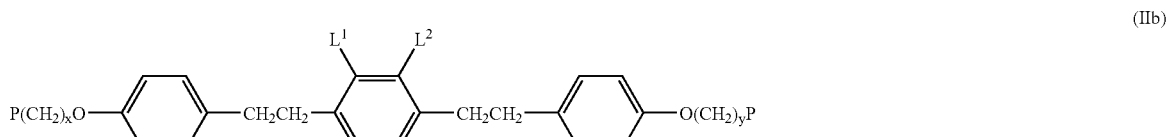 (IIb)
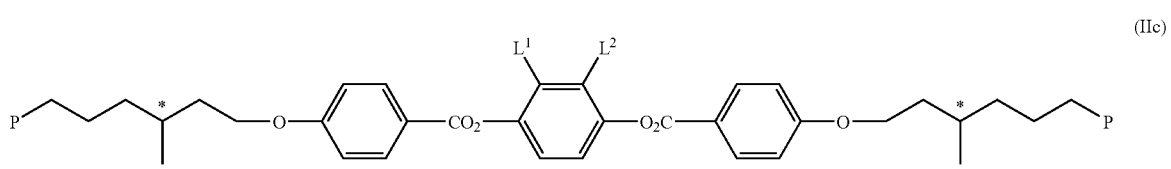 (IIc)

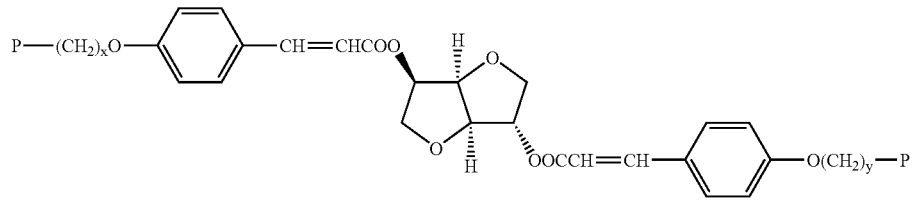

(IId)

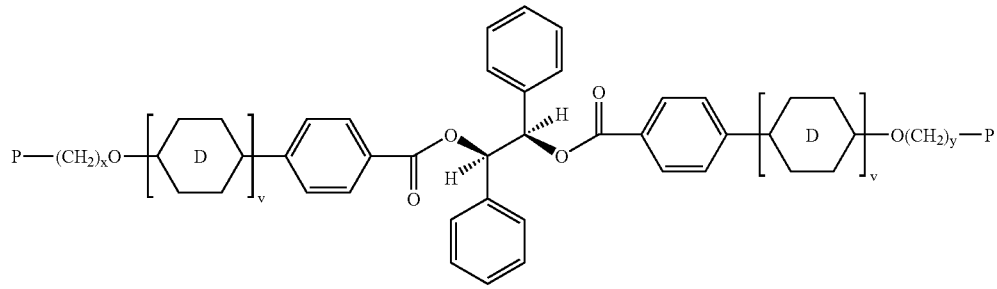

(IIe)

In the above formulae, P is a polymerizable group, preferably an acryl, methacryl, vinyl, vinyloxy, propenyl ether, epoxy or stytryl group, x and y are each independently 1 to 12, A is 1,4-phenylene that is optionally mono- di or trisubstituted by $L^1$ or 1,4-cyclohexylene, v is 0 or 1, $Z^0$ is —COO—, —OCO—, —CH$_2$CH$_2$— or a single bond, Y is a polar group, $R^0$ is an unpolar alkyl or alkoxy group, Ter is a terpenoid radical like e.g. menthyl, Chol is a cholesteryl group, and $L^1$ and $L^2$ are each independently H, F, Cl, CN or an optionally halogenated alkyl, alkoxy, alkylcarbonyl, alkoxycarbonyl or alkoxycarbonyloxy group with 1 to 7 C atoms.

The term 'polar group' in this connection means a group selected from F, Cl, CN, NO$_2$, OH, OCH$_3$, OCN, SCN, an optionally fluorinated carbonyl or carboxyl group with up to 4 C atoms or a mono- oligo- or polyfluorinated alkyl or alkoxy group with 1 to 4 C atoms.

The term 'unpolar group' means an alkyl group with 1 or more, preferably 1 to 12 C atoms or an alkoxy group with 2 or more, preferably 2 to 12 C atoms.

The chiral polymerizable mesogenic material may also comprise one or more non-polymerizable chiral dopants in addition or alternatively to chiral polymerizable mesogenic compounds. Especially preferred are chiral dopants with a high helical twisting power (HTP), in particular those disclosed in WO 98/00428. Further typically used chiral dopants are e.g. the commercially available S 1011, R 811 or CB 15 (from Merck KGaA, Darmstadt, Germany).

Especially preferred are chiral non-polymerizable dopants selected from the following formulae

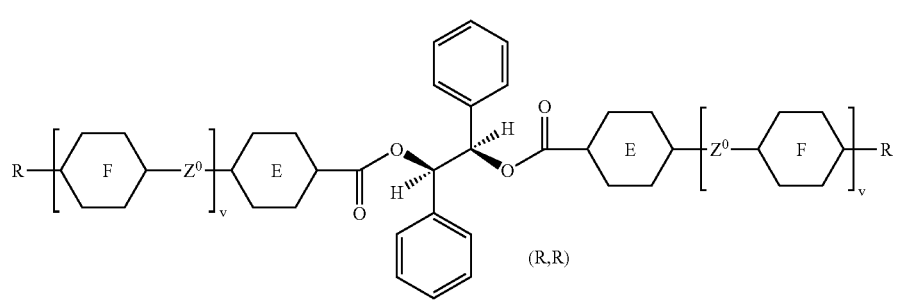

including the (R,S), (S,R), (R,R) and (S,S) enantiomers not shown, wherein E and F are each independently 1,4-phenylene or trans-1,4-cyclohexylene, v is 0 or 1, $Z^o$ is —COO—, —OCO—, —CH$_2$CH$_2$— or a single bond, and R is alkyl, alkoxy or alkanoyl with 1 to 12 C atoms.

The compounds of formula IIIa and their synthesis are described in WO 98/00428. The compounds of formula IIIb and their synthesis are described in GB 2,328,207.

The above chiral compounds of formula IIIa and IIIb exhibit a very high helical twisting power (HTP), and are therefore particularly useful for the preparation of a highly twisted A-plate as used in the present invention.

The polymerizable mesogenic material is coated onto substrate, aligned into a uniform orientation and polymerized according to a process as described in WO 98/12584 or GB 2,315,072, thereby permanently fixing the orientation of the polymerizable mesogenic material.

As a substrate for example a glass or quartz sheet or a plastic film or sheet can be used. It is also possible to put a second substrate on top of the coated mixture prior to and/or during and/or after polymerization. The substrates can be removed after polymerization or not. When using two substrates in case of curing by actinic radiation, at least one substrate has to be transmissive for the actinic radiation used for the polymerization. Isotropic or birefringent substrates can be used. In case the substrate is not removed from the polymerized film after polymerization, preferably isotropic substrates are used.

Preferably at least one substrate is a plastic substrate such as for example a film of polyester such as polyethyleneterephthalate (PET), of polyvinylalcohol (PVA), polycarbonate (PC) or triacetylcellulose (TAC), especially preferably a PET film or a TAC film. As a birefringent substrate for example an uniaxially stretched plastic film can be used. For example PET films are commercially available from ICI Corp. under the trade name Melinex.

The polymerizable mesogenic material can also be dissolved in a solvent, preferably in an organic solvent. The solution is then coated onto the substrate, for example by spin-coating or other known techniques, and the solvent is evaporated off before polymerization. In most cases it is suitable to heat the mixture in order to facilitate the evaporation of the solvent.

For preparing the twisted A-plate, it is necessary to achieve planar alignment in the layer of the chiral polymerizable material, i.e. with the helical axis being oriented substantially perpendicular to the plane of the layer. Planar alignment can be achieved for example by shearing the material, e.g. by means of a doctor blade. It is also possible to apply an alignment layer, for example a layer of rubbed polyimide or sputtered SiO$_x$, on top of at least one of the substrates.

Planar alignment of the polymerizable mesogenic material can also be achieved by directly rubbing the substrate, i.e. without applying an additional alignment layer. This is a considerable advantage as it allows a significant reduction of the production costs of the optical retardation film. In this way a low tilt angle can easily be achieved.

For example rubbing can be achieved by means of a rubbing cloth, such as a velvet cloth, or with a flat bar coated with a rubbing cloth. In a preferred embodiment of the present invention rubbing is achieved by means of a at least one rubbing roller, like e.g. a fast spinning roller that is brushing across the substrate, or by putting the substrate between at least two rollers, wherein in each case at least one of the rollers is optionally covered with a rubbing cloth. In another preferred embodiment of the present invention rubbing is achieved by wrapping the substrate at least partially at a defined angle around a roller that is preferably coated with a rubbing cloth.

Planar alignment with a low tilt angle can be achieved by adding a surfactant to the polymerizable mesogenic material. Suitable surfactants are described for example in J. Cognard, Mol.Cryst.Liq.Cryst. 78, Supplement 1, 1–77 (1981). Particularly preferred are non-ionic surfactants, such as mixtures of non-ionic fluoroalkylalkoxylate surfactants selected from formula IV and V

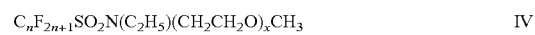

wherein n is an integer from 4 to 12 and x is an integer from 5 to 15. Upon using these surfactants it is possible to produce polymerized films with a low tilt angle in the range from 0 to 1 degrees, in particular 0 to 0.5 degrees. In the best case the tilt angle is approximately 0 degrees.

The surfactants of formula IV are commercially available under the trade name Fluorad 171 (from 3M Co.), the surfactants of formula V under the trade name Zonyl FSN (from DuPont).

In case surfactants are used, the polymerizable mesogenic material contains preferably from 500 to 2500 ppm, in particular from 1000 to 2500 ppm, very preferably from 1500 to 2500 ppm of surfactants.

The orientation of the mesogenic material depends, inter alia, on the film thickness, the type of substrate material, and the composition of the polymerizable mesogenic material. It is therefore possible, by changing these parameters, to control the structure of the film, in particular specific parameters such as the tilt angle and its degree of variation.

Polymerization of the polymerizable mesogenic material takes place by exposing it to heat or actinic radiation. Actinic radiation means irradiation with light, like UV light, IR light or visible light, irradiation with X-rays or gamma rays or irradiation with high energy particles, such as ions or electrons. Preferably polymerization is carried out by UV irradiation.

As a source for actinic radiation for example a single UV lamp or a set of UV lamps can be used. When using a high lamp power the curing time can be reduced. Another possible source for actinic radiation is a laser, like e.g. a UV laser, an IR laser or a visible laser.

The polymerization is carried out in the presence of an initiator absorbing at the wavelength of the actinic radiation. For example, when polymerizing by means of UV light, a photoinitiator can be used that decomposes under UV irradiation to produce free radicals or ions that start the polymerization reaction.

When curing polymerizable mesogens with acrylate or methacrylate groups, preferably a radical photoinitiator is used, when curing polymerizable mesogens vinyl and epoxide groups, preferably a cationic photoinitiator is used.

It is also possible to use a polymerization initiator that decomposes when heated to produce free radicals or ions that start the polymerization.

As a photoinitiator for radical polymerization for example the commercially available Irgacure 651, Irgacure 184, Darocure 1173 or Darocure 4205 (all from Ciba Geigy AG) can be used, whereas in case of cationic photopolymerization the commercially available UVI 6974 (Union Carbide) can be used.

The polymerizable mesogenic material preferably comprises 0.01 to 10%, very preferably 0.05 to 5%, in particular 0.1 to 3% of a polymerization initiator. UV photoinitiators are preferred, in particular radicalic UV photoinitiators.

The curing time is dependening, inter alia, on the reactivity of the polymerizable mesogenic material, the thickness of the coated layer, the type of polymerization initiator and the power of the UV lamp. The curing time according to the invention is preferably not longer than 10 minutes, particularly preferably not longer than 5 minutes and very particularly preferably shorter than 2 minutes. For mass production short curing times of 3 minutes or less, very preferably of 1 minute or less, in particular of 30 seconds or less, are preferred.

In addition to polymerization initiators the polymerizable material may also comprise one or more other suitable components such as, for example, catalysts, stabilizers, chain-transfer agents, co-reacting monomers or surface-active compounds. In particular the addition of stabilizers is preferred in order to prevent undesired spontaneous polymerization of the polymerizable material for example during storage.

As stabilizers in principal all compounds can be used that are known to the skilled in the art for this purpose. These compounds are commercially available in a broad variety. Typical examples for stabilizers are 4-ethoxyphenol or butylated hydroxytoluene (BHT).

Other additives, like e.g. chain transfer agents, can also be added to the polymerizable material in order to modify the physical properties of the inventive polymer film. When adding a chain transfer agent, such as monofunctional thiol compounds like e.g. dodecane thiol or multifunctional thiol compounds like e.g. trimethylpropane tri(3-mercaptopropionate), to the polymerizable material, the length of the free polymer chains and/or the length of the polymer chains between two crosslinks in the inventive polymer film can be controlled. When the amount of the chain transfer agent is increased, the polymer chain length in the obtained polymer film is decreasing.

It is also possible, in order to increase crosslinking of the polymers, to add up to 20% of a non mesogenic compound with two or more polymerizable functional groups to the polymerizable material alternatively or in addition to the di- or multifunctional polymerizable mesogenic compounds to increase crosslinking of the polymer.

Typical examples for difunctional non mesogenic monomers are alkyldiacrylates or alkyldimethacrylates with alkyl groups of 1 to 20 C atoms. Typical examples for non mesogenic monomers with more than two polymerizable groups are trimethylpropanetrimethacrylate or pentaerythritoltetraacrylate.

In another preferred embodiment the mixture of polymerizable material comprises up to 70%, preferably 3 to 50% of a non mesogenic compound with one polymerizable functional group. Typical examples for monofunctional non mesogenic monomers are alkylacrylates or alkylmethacrylates.

It is also possible to add, for example, a quantity of up to 20% by weight of a non polymerizable liquid-crystalline compound to adapt the optical properties of the optical retardation film.

In some cases it is of advantage to apply a second substrate to aid alignment and exclude oxygen that may inhibit the polymerization. Alternatively the curing can be carried out under an atmosphere of inert gas. However, curing in air is also possible using suitable photoinitiators and high UV lamp power. When using a cationic photoinitiator oxygen exclusion most often is not needed, but water should be excluded. In a preferred embodiment of the invention the polymerization of the polymerizable mesogenic material is carried out under an atmosphere of inert gas, preferably under a nitrogen atmosphere.

To obtain a polymer film with the desired molecular orientation the polymerization has to be carried out in the liquid crystal phase of the polymerizable mesogenic material. Therefore, preferably polymerizable mesogenic compounds or mixtures with low melting points and broad liquid crystal phase ranges are used. The use of such materials allows-to reduce the polymerization temperature, which makes the polymerization process easier and is a considerable advantage especially for mass production.

The selection of suitable polymerization temperatures depends mainly on the clearing point of the polymerizable material and inter alia on the softening point of the substrate. Preferably the polymerization temperature is at least 30 degrees below the clearing temperature of the polymerizable mesogenic mixture.

Polymerization temperatures below 120° C. are preferred. Especially preferred are temperatures below 90° C., in particular temperatures of 60° C. or less.

The invention is further explained by the following examples.

EXAMPLE 1

The following polymerizable mixture is formulated

| | |
|---|---|
| Compound (1) | 18.2% |
| Compound (2) | 31.9% |
| Compound (3) | 41.0% |
| Compound (4) | 3.0% |
| Irgacure 907 ® | 5.5% |
| Fluorad FC171 | 0.5% |

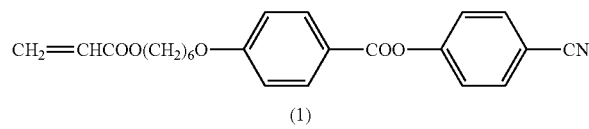

(1)

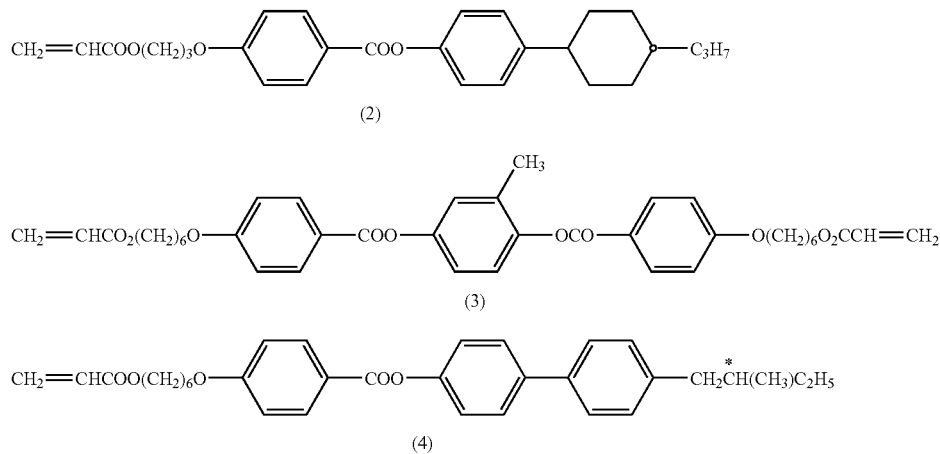

Compound (2) is described in GB 2,280,445. Compounds (1) and (3) can be prepared according to or in analogy to the methods described in D. J. Broer et al., Makromol.Chem. 190, 3201–3215 (1989). Compound (4) is described in DE 195 04 224. Irgacure 907® is a commercially available photoinitiator (from Ciba AG, Basel, Switzerland). Fluorad FC 171 is a commercially available non-ionic fluorocarbon surfactant (from 3M Corp.).

The above mixture is dissolved in toluene/cyclohexanone 7:3 at a concentration of 33% by weight. The solution is coated onto a TAC substrate, which had been previously rubbed to induce planar alignment on the substrate surface, to give a wet film of 4 μm thickness. The solvent is allowed to evaporate and the resulting film was polymerized by exposure to UV radiation (65 mW/cm$^2$) to give a cholesteric polymer film.

Figure 2A:
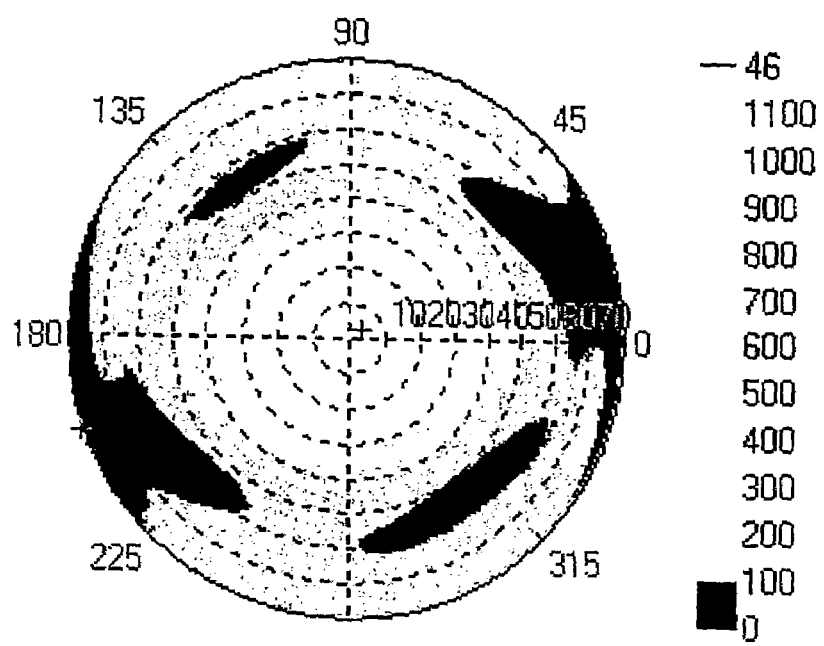
FIG. 2a shows the luminance versus viewing angle of a stack comprising a broadband reflective polarizer, a twisted A-plate QWF according to the present invention and a linear polarizer.
Figure 2B:
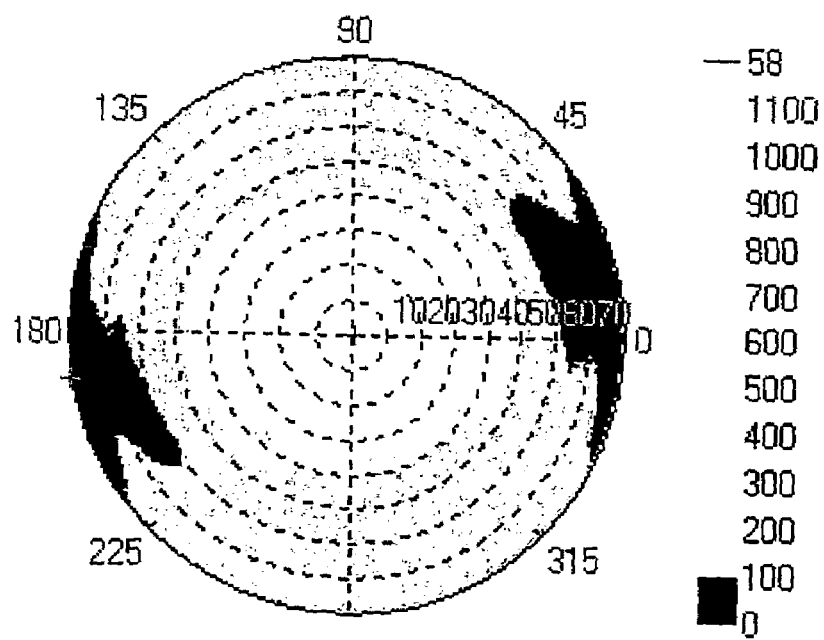
FIG. 2b shows the luminance versus viewing angle of a of a stack comprising a broadband reflective polarizer, a prior art QWF and a linear polarizer.

The cholesteric polymer film is used as QWF in a stack comprising a broadband reflective polarizer as described in EP 0 982 605, the QWF and a linear polarizer. FIG. 2a shows the luminance of this stack. FIG. 2b shows the luminance of a combination of the same broadband polarizer with a standard QWF of stretched polycarbonate according to prior art and the same linear polarizer. The stack comprising the QWF of example 1 has a performance comparable to the stack comprising the prior art QWF, whilst providing the advantage of easier manufacture.

The preceding examples can be repeated with similar success by substituting the generically or specifically described reactants and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various conditions and usages.

The invention claimed is:

1. Combination of optical films comprising at least one twisted A-plate quarter wave retarder, which comprises a linear or crosslinked polymerized chiral liquid crystalline material with helically twisted structure and planar orientation, and at least one polarizer, wherein the twisted A-plate quarter wave retarder is capable of having the alignment set at any angle during combining with the polarizer and wherein the retardation is determined by the twist and the thickness of the twisted A-plate quarter wave retarder.

2. Combination according to claim 1, wherein the polarizer is a circular polarizer.

3. Combination according to claim 2, wherein the polarizer is a broadband reflective polarizer.

4. Combination according to claim 2, wherein the twisted A-plate quarter wave retarder converts substantially circular polarized light transmitted or reflected by the polarizer into substantially linear polarized light.

5. Combination according to claim 1, wherein the polarizer is a linear polarizer.

6. Combination according to claim 5, wherein the twisted A-plate quarter wave retarder converts substantially linear polarized light transmitted or reflected by the polarizer into substantially circular polarized light.

7. A combination according to claim 5, wherein the combination is in the form of an anti-reflection film.

8. A display device, comprising an anti-reflection film according to claim 7.

9. A display device according to claim 8, which is a liquid crystal, organic light emitting diode or cathode ray tube display.

10. Combination according to claim 1, wherein twist angle φ in the twisted A-plate quarter wave retarder is 20 to 400°.

11. Combination according to claim 1, wherein thickness d of the twisted A-plate quarter wave retarder is 0.5 to 2.5 μm.

12. Combination according to claim 1, wherein the optical retardation of the twisted A-plate quarter wave retarder is 6 to 300 nm.

13. An active or passive optical element, polarizer, compensator, beam splitter, colour filter, projection system, electrooptical display, a liquid crystal display, an organic light emitting diode, a cathode ray tube display, or a light-enhancing or anti-reflection film for a display comprising a combination according to claim 1.

14. A liquid crystal display comprising the following components:
   a liquid crystal cell formed by two transparent substrates having surfaces which oppose each other,
   an electrode layer provided on the inside of at least one of said two transparent substrates and optionally superposed with an alignment layer, a liquid crystal medium which is present between the two transparent substrates, a first and a second linear polarizer sandwiching the liquid crystal cell, a light source or a reflective layer on the side of the second linear polarizer facing away from the liquid crystal cell, at least one broadband reflective polarizer situated between the second linear polarizer and the light source or reflective layer, at least one twisted A-plate wave retarder, situated between the broadband reflective polarizer and the second linear polarizer wherein the combination of the twisted A-plate quarter wave retarder ani the second linear polarizer makes up the combination according to claim 1, optionally at least one C-plate retarder situated between the broadband reflective polarizer and the twisted A-plate quarter wave retarder, optionally one or more further optical retardation or compensation films or layers, which can be situated adjacent to one or both sides of each of the above components, it being possible for the above components to be separated, stacked, mounted on top of each other, coated on top of each other or connected by means of adhesive layers.

15. A liquid crystal display according to claim 14, wherein the twisted A-plate quarter wave retarder comprises a linear or crosslinked polymerized chiral liquid crystalline material with helically twisted structure and planar orientation.

16. A liquid crystal display according to claim 14, wherein the twisted A-plate quarter wave retarder converts substantially circular polarized light transmitted or reflected by the polarizer into substantially linear polarized light.

17. A liquid crystal display according to claim 14, wherein twist angle $\phi$ in the twisted A-plate quarter wave retarder is 20 to 340°.

18. A liquid crystal display comprising the following components:

a linear polarizer, a liquid crystal cell formed by two transparent substrates having surfaces which oppose each other, an electrode layer provided on the inside of at least one of said two transparent substrates and optionally superposed with an alignment layer, and a liquid crystal medium which is present between the two transparent substrates, at least one twisted A-plate quarter wave retarder, situated between the linear polarizer and the liquid crystal cell, which makes up a combination according to claim 1, a reflective layer at the side of the liquid crystal cell facing away from the linear polarizer, it being possible for the above components to be separated, stacked, mounted on top of each other, coated on top of each other or connected by means of adhesive layers.

19. A combination according to claim 1, wherein the retarder and polarizer are laminated together roll-to-roll.

* * * * *

UNITED STATES PATENT AND TRADEMARK OFFICE
CERTIFICATE OF CORRECTION

PATENT NO. : 7,187,424 B2 Page 1 of 1
APPLICATION NO. : 10/471585
DATED : March 6, 2007
INVENTOR(S) : Owin Parri It is certified that error appears in the above-identified patent and that said Letters Patent is hereby corrected as shown below:

Column 21, line 10 reads "plate wave retarder" should read -- plate quarter wave retarder --
Column 21, line 13 reads "ani the second" should read -- and the second --
Column 21, line 20 reads "films or layers, ¶ which can be situated" should read -- films or layers, which can be situated -- (remove line break)
Column 21, line 22 reads "components, it being possible" should read -- components, ¶ it being possible -- (insert line break)
Column 22, line 22 reads "polarizer, it being possible" should read -- polarizer, ¶ it being possible -- (insert line break)

Signed and Sealed this

Twenty-fourth Day of June, 2008

JON W. DUDAS
*Director of the United States Patent and Trademark Office*